(12) United States Patent
Yang et al.

(10) Patent No.: US 12,014,882 B2
(45) Date of Patent: Jun. 18, 2024

(54) TANTALUM CAPACITOR

(71) Applicant: SAMSUNG ELECTRO-MECHANICS CO., LTD., Suwon-si (KR)

(72) Inventors: Wan Suk Yang, Suwon-si (KR); Hong Kyu Shin, Suwon-si (KR); Choon Woo Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/734,456

(22) Filed: May 2, 2022

(65) Prior Publication Data

US 2023/0135896 A1  May 4, 2023

(30) Foreign Application Priority Data

Oct. 29, 2021  (KR) .................... 10-2021-0146405

(51) Int. Cl.
| | |
|---|---|
| *H01G 9/008* | (2006.01) |
| *H01G 9/048* | (2006.01) |
| *H01G 9/15* | (2006.01) |
| *H01G 9/04* | (2006.01) |

(52) U.S. Cl.
CPC ............. *H01G 9/008* (2013.01); *H01G 9/048* (2013.01); *H01G 9/15* (2013.01); *H01G 2009/05* (2013.01)

(58) Field of Classification Search
CPC ..................................................... H01G 9/012
USPC ........................................................... 361/540
See application file for complete search history.

(56) References Cited

U.S. PATENT DOCUMENTS

| | | | | |
|---|---|---|---|---|
| 6,236,561 | B1* | 5/2001 | Ogino ................... | H01G 9/012 361/301.3 |
| 2006/0285277 | A1* | 12/2006 | Hirata ..................... | H01G 9/15 361/528 |
| 2007/0171599 | A1* | 7/2007 | Matsuoka .............. | H01G 9/012 361/540 |

(Continued)

FOREIGN PATENT DOCUMENTS

| | | |
|---|---|---|
| JP | 2012-191198 A | 10/2012 |
| KR | 10-2020-0060010 A | 5/2020 |
| KR | 10-2021-0016811 A | 2/2021 |

*Primary Examiner* — Eric W Thomas
(74) *Attorney, Agent, or Firm* — Morgan, Lewis & Bockius LLP

(57) ABSTRACT

A tantalum capacitor includes: a tantalum body including tantalum powder and having a tantalum wire exposed to one end surface; a molded portion having fifth and sixth surfaces opposing each other in a first direction, third and fourth surfaces opposing each other in a second direction, and first and second direction opposing each other in a third direction, and disposed to surround the tantalum body; an anode lead frame exposed to the second surface of the molded portion and electrically connected to the tantalum wire; and a cathode lead frame spaced apart from the anode lead frame and exposed to the second surface of the molded portion. The anode lead frame includes a first connection portion and a first bent portion, and the first bent portion forms an angle of inclination, ranging from 70° or more to 80° or less, to a side of the tantalum body with respect to the first connection portion.

18 Claims, 5 Drawing Sheets

(56) References Cited

U.S. PATENT DOCUMENTS

| | | |
|---|---|---|
| 2009/0231784 A1* | 9/2009 | Matsuoka ................ H01G 9/04 |
| | | 361/528 |
| 2010/0061037 A1* | 3/2010 | Zednicek ................ H01G 9/15 |
| | | 361/523 |
| 2010/0103591 A1* | 4/2010 | Fujii ........................ H01G 9/15 |
| | | 29/25.03 |
| 2012/0229956 A1 | 9/2012 | Zednicek |
| 2015/0077904 A1* | 3/2015 | Kwak .................. H01G 9/0029 |
| | | 29/25.03 |
| 2020/0168405 A1 | 5/2020 | Shin et al. |
| 2021/0043391 A1 | 2/2021 | Jung |

\* cited by examiner

TANTALUM CAPACITOR

CROSS-REFERENCE TO RELATED APPLICATION(S)

The present application claims the benefit of priority to Korean Patent Application No. 10-2021-0146405, filed on Oct. 29, 2021 in the Korean Intellectual Property Office, the entire disclosure of which is incorporated herein by reference.

TECHNICAL FIELD

The present disclosure relates to a tantalum capacitor, and more particularly, to a tantalum capacitor having improved capacitance.

BACKGROUND

The slimming of set devices results in the miniaturization of components in the components industry. In addition, battery capacity has been increased as a size of a display device such as a smartphone, a tablet PC, or the like, is increased and high-specification application processors (APs) are applied, so that capacitors are required to have high capacity and miniaturization.

A tantalum (Ta) material is a metal that is widely used throughout various industries such as the electrical, electronic, mechanical, chemical, aerospace, and defense industries due to having mechanical and physical characteristics such as a high melting point, excellent ductility and excellent corrosion-resistance, or the like. In particular, since the tantalum material may form the most stable anodic oxide film, tantalum has been widely used as a material in forming anodes for small capacitors. Moreover, due to the rapid development of the IT industry, such as electronics and information and communication, the use of tantalum materials is increasing rapidly every year.

A tantalum capacitor according to the related art uses a structure, in which a terminal is led out to an external entity without an internal lead frame or a frame, to connect a tantalum material and an electrode to each other.

In this case, in the case of the structure using the internal lead frame, a space occupied by the tantalum material in the molded portion may be decreased by the lead frame constituting an anode and a cathode, and capacitance is in proportion to a volume of the tantalum material. In this case, capacitance may be limited. In the case of the structure in which a terminal is led out to an external entity without a frame, equivalent series resistance (ESR) of a capacitor is increased because a contact resistance is increased by a plurality of contact materials due to presence of the plurality of contact materials.

In addition, in the case of a structure according to the related art in which a terminal is led out to the outside without a frame, a cathode lead frame is disposed on a side surface of a product. Thus, capacitance may be deteriorated because an internal volume fraction of the tantalum material is reduced due to the need to secure a welding distance at which a solder is formed between the tantalum material and the cathode lead frame.

SUMMARY

An aspect of the present disclosure is to provide a tantalum capacitor which may implement high capacitance.

Another aspect of the present disclosure is to provide a tantalum capacitor having improved reliability by increasing mechanical strength.

Another aspect of the present disclosure is to provide a tantalum capacitor which may improve a breakdown voltage (BDV) by increasing a withstand voltage.

Another aspect of the present disclosure is to provide a tantalum capacitor which may prevent short-circuits caused by a contact between a terminal and a tantalum body.

Another aspect of the present disclosure is to provide a tantalum capacitor which may reduce equivalent series resistance (ESR).

According to an aspect of the present disclosure, a tantalum capacitor includes: a tantalum body including tantalum powder and having a tantalum wire exposed to one end surface of the tantalum body; a molded portion having two surfaces opposing each other in a first direction, two surfaces opposing each other in a second direction, and two direction opposing each other in a third direction, the two surfaces opposing in the third direction being first and second surfaces, the two surfaces opposing in the second direction being third and fourth surfaces, the two surfaces opposing in the first direction being fifth and sixth surfaces; an anode lead frame exposed to the second surface of the molded portion and electrically connected to the tantalum wire; and a cathode lead frame spaced apart from the anode lead frame and exposed to the second surface of the molded portion. The anode lead frame includes a first connection portion and a first bent portion, and the first bent portion forms an angle of inclination, ranging from 70° or more to 80° or less, with respect to the first connection portion, in which the first bent portion is inclined toward a side of the tantalum body.

According to another aspect of the present disclosure, a tantalum capacitor includes: a tantalum body including tantalum powder and having a tantalum wire exposed to one end surface of the tantalum body; a molded portion surrounding the tantalum body; an anode lead frame embedded in the molded portion and exposed to one surface of the molded portion; and a cathode lead frame spaced apart from the anode lead frame and exposed to the one surface of the molded portion. The anode lead frame includes a first connection portion exposed to the one surface of the molded portion and a first bent portion extending from the first connection portion to be connected to the tantalum wire in a slanted angle with respect to the first connection portion, and a portion of the first connection portion overlaps at least one portion of the tantalum body in a direction perpendicular to the one surface of the tantalum body.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
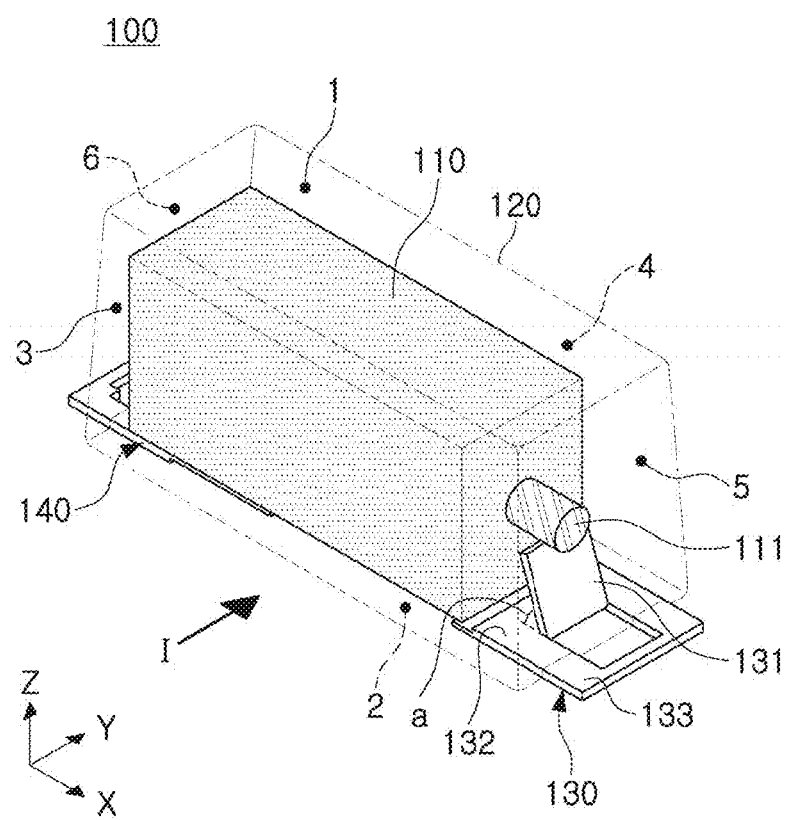
FIGS. 1 and 2 are perspective views of a tantalum capacitor according to an embodiment of the present disclosure, taken in different directions.

Hereinafter, embodiments of the present disclosure will be described as follows with reference to the attached drawings. It is not intended to limit the techniques described herein to specific embodiments, and it should be understood to include various modifications, equivalents, and/or alternatives to the embodiments of the present disclosure. In connection with the description of the drawings, similar reference numerals may be used for similar components.

In the drawings, for clarity of description, parts irrelevant to the description may be omitted, and thicknesses of elements may be magnified to clearly represent layers and regions. Components having the same functions within a scope of the same idea may be described using the same reference numerals.

Hereinafter, exemplary embodiments of the present disclosure will be described with reference to accompanying drawings.

In the drawings, an X direction may be defined as a first direction, an L direction, or a length direction, a Y direction may be defined as a second direction, a W direction, or a width direction, and a Z direction defined as a third direction, a T direction, or a thickness direction.

Figure 2:
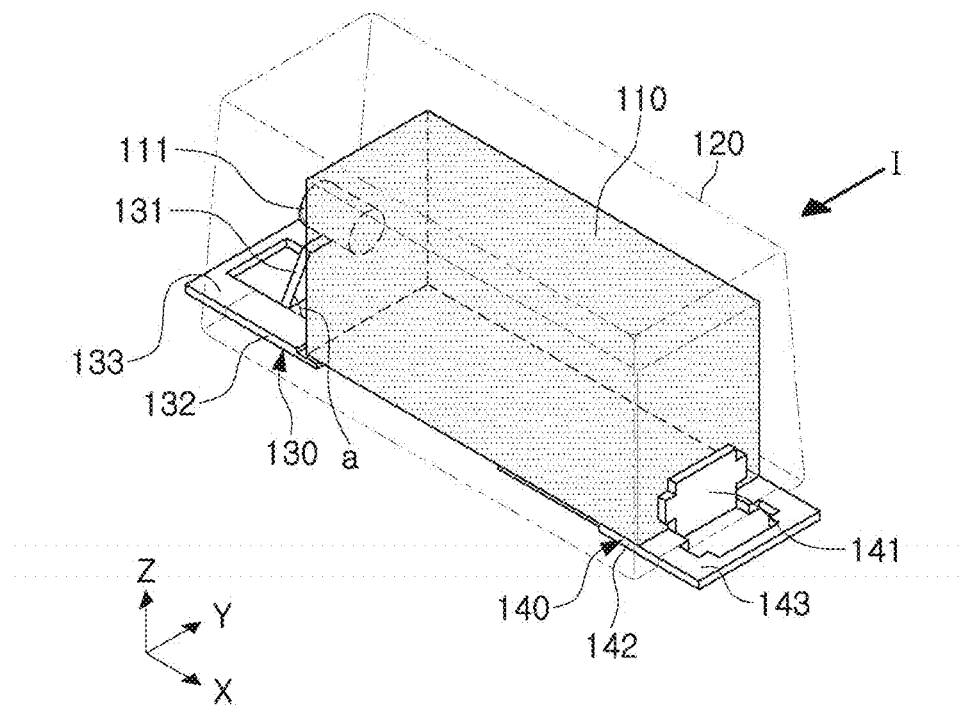
Figure 3:
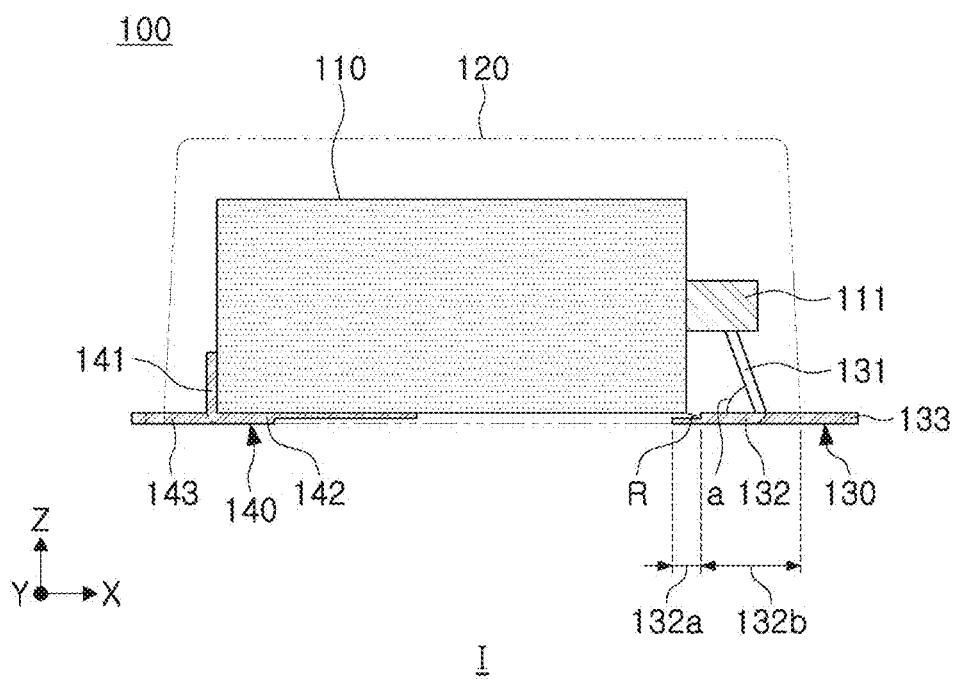
FIG. 3 is a side view of the tantalum capacitor of FIG. 1, taken in an I-direction.

FIGS. 1 and 2 are perspective views of a tantalum capacitor according to an embodiment, taken in different directions. FIG. 3 is a side view of the tantalum capacitor of FIG. 1, taken in an I-direction.

Referring to FIGS. 1 and 2, a tantalum capacitor 1000 according to an exemplary embodiment may include a tantalum body 110 including tantalum powder and having a tantalum wire 111 exposed to one end surface, a molded portion 120 having fifth and sixth surfaces 5 and 6 opposing each other in a first direction, third and fourth surfaces 3 and 4 opposing each other in a second direction, and first and second surfaces 1 and 2 opposing each other in a third direction, and formed to surround the tantalum body 110, an anode lead frame 130 exposed to the second surface 2 of the molded portion 120 and electrically connected to the tantalum wire 111, and a cathode lead frame 140 spaced apart from the anode lead frame 130 and exposed to the second surface 2 of the molded portion 120.

In this case, the anode lead frame 130 may include a first connection portion 132, a first lead portion 133, and a first bent portion 131. The first bent portion 131 may extend from the first connection portion 132 to be connected to the tantalum wire 111 in a slanted angle with respect to the first connection portion 132. The first bent portion 131 may have an angle of inclination within a range of 70° or more to 80° or less toward the tantalum body 110 with respect to the first connection portion 132.

The tantalum body 110 may be formed of a tantalum material. As an example, the tantalum body 110 may be manufactured by mixing and stirring a metal powder and a binder at a predetermined ratio, compressing the mixed powder into a rectangular parallelepiped form, and sintering the compressed powder under high temperature and high vibration.

The tantalum body 110 may have a tantalum wire 111 exposed in an X direction of the body. The tantalum wire 111 may be inserted into a mixture of the tantalum powder and a binder to be off-centered within the body, before mixed powder of the tantalum powder and the binder is compressed. For example, the tantalum body 110 may be manufactured by molding a tantalum element in a desired size by inserting the tantalum wire 111 into the tantalum powder mixed with the binder and sintering the tantalum element at a high temperature under high vacuum ($10^{-5}$ torr or less) for about 30 minutes.

The anode lead frame 130 may be formed of a conductive metal such as a nickel/iron alloy, and may include a first connecting portion 132, a first bent portion 131, and a first lead portion 133 formed to be integrated with each other.

In an exemplary embodiment, the first connection portion 132 of the anode lead frame 130 may be exposed to the second surface 2 of the molded portion 120 to serve as a terminal when a board is mounted. In this case, the first connection portion 132 may be disposed to be spaced apart from the tantalum body 110, and a space between the connection portion 132 and the tantalum body 110 spaced apart from each other may be filled with a resin component to be described later, or the like, constituting the molded portion 120.

In an exemplary embodiment, the first lead portion 133 may refer to a portion, excluding the first connection portion 132 and the first bent portion 131, in the anode lead frame 130. In this case, the anode lead frame 130 may include a cut surface. A portion, which is bent with respect to the cut surface, and a portion, which is not bent with respect to the cut surface, may refer to the first bent portion 131 and the first lead portion 133, respectively. The cut surface may be formed in a first direction, a second direction, and/or a third direction of the anode lead frame 130. The tantalum capacitor 100 according to the exemplary embodiment of FIG. 1 may have a structure in which an anode lead frame has a cut surface and a first lead portion is present. Alternatively, the tantalum capacitor 100 may have a structure, in which an anode lead frame does not have the cut surface, to be described later in FIG. 7. The structure, in which an anode lead frame does not have the cut surface, may refer to a structure in which only a first bent portion is present while a first lead portion is absent.

In an exemplary embodiment, the first bent portion 131 may form an angle of inclination "a" within a range of 70° or more to 80° or less toward the tantalum body 110 with respect to the first connection portion 132. For example, a size of the acute angle "a" formed between the first connection portion 132 and the first bent portion 131 may be 70° or more to 80° or less. When the first bent portion 131 forms an angle of inclination "a" toward the tantalum body 110, it may refer to a structure in which an end of the other side of the bending portion is directed toward the tantalum body in the first bent portion 131. Referring to FIGS. 1 to 3, the angle of inclination "a" may refer to an angle between the first bent portion 131 and the first connection portion 132. The angle of inclination "a" may be 80° or less, 79° or less, 78° or less, 77° or less, 76° or less, or 75° or less, but exemplary embodiments are not limited thereto. When the angle of inclination "a" between the first bent portion 131 and the first connection portion 132 satisfies the above range, sagging of the first bent portion 131, caused by depression when the tantalum wire 111 is welded to the first bent portion 131, may not occur. In addition, since the sagging of the first bent portion 131 may be significantly reduced as compared with the tantalum capacitor according to the related art in which an existing support portion is required, a shape of the first bent portion 131 may be maintained without a support portion. Meanwhile, when the angle of inclination "a" between the first bent portion 131 and the first connection portion 132 is outside of the above range, there is a high possibility that the tantalum wire 111 and/or the tantalum body 110 is exposed due to a change in positions of the tantalum body 110 and the tantalum wire 111. For example, when the angle of inclination "a" is greater than 80°, the tantalum wire 111 may be outwardly exposed from the fifth surface 5 of the molded portion 120, or the tantalum body 110 may be outwardly removed from the first surface 1 of the molded portion 120.

In the present disclosure, the angle of inclination angle "a" may refer to an acute angle formed by the first bent portion 131 and the first connection portion 132. In this case, since each of the first bent portion 131 and the first connection portion 132 has a three-dimensional shape having a width in the Y direction, the angle of inclination "a" may be an average value of angles measured in a plurality of regions having a width of the first bent portion 131 in a Y-direction, rather than an angle in one region. As an example, in a region in which the first bent portion 131 forms an acute angle with the first connection portion 132, angles of ten points spaced apart from each other at regular intervals in a Y-direction (a width direction) may all be measured, and an average value of the measured angles may be designated as the angle of inclination "a". Other measurement methods and/or tools appreciated by one of ordinary skill in the art, even if not described in the present disclosure, may also be used.

In the tantalum capacitor 100 according to an exemplary embodiment, the angle of inclination "a" between the first bent portion 131 and the first connection portion 132 may be in a range of 70° or more. The angle of inclination "a" may be 71° or more, 72° or more, 73° or more, 74° or more, or 75° or more, but exemplary embodiments are not limited thereto. When the angle of inclination "a" between the first bent portion 131 and the first connection portion 132 satisfies the above-mentioned range, mechanical reliability of a product may be improved while increasing capacity of the product. Meanwhile, when the angle of inclination "a" is outside of the above range, the tantalum body 110 and the first connection portion 132 of the anode lead frame 130 may be brought into contact with each other to cause short-circuits.

The above-described first bent portion 131 may be formed in a central portion of the anode lead frame 130 (see FIGS. 1 to 8), but exemplary embodiments are not limited thereto. The first bent portion 131 may be formed on an external side of the anode lead frame 130 or on one side of the anode lead frame 130, but exemplary embodiments are also not limited thereto. The first bent portion 131 may be bent at the anode lead frame 131 and may be transformed into various forms connected to the tantalum wire 111, as a structure satisfying the above-described angle of inclination.

Table 1 illustrates an experimental example in which an angle of inclination "a" between the first bent portion 131 and the first connection portion 132 is different with respect to the tantalum capacitor 100 in which the tantalum body 110 having a length L of 7.3 mm, a width W of 4.3 mm, and a thickness T of 1.5 mm is applied to a molded portion 120 having a length L of 4.45 mm and a thickness of 1.1 mm.

TABLE 1

| Gradient (a) (°) | Bending Height (mm) | Wire Exposure (Top) | Exposure Defect (Bot) | Short-circuits (High LC) | Exposure Defect (MK) |
|---|---|---|---|---|---|
| 95 | 0.67 | X | ○ | X | ○ |
| 90 | 0.67 | X | ○ | ○ | ○ |
| 85 | 0.67 | X | ○ | ○ | ○ |
| 80 | 0.65 | ○ | ○ | ○ | ○ |
| 75 | 0.64 | ○ | ○ | ○ | ○ |
| 70 | 0.63 | ○ | ○ | ○ | ○ |
| 65 | 0.61 | ○ | ○ | ○ | X |
| 60 | 0.58 | ○ | X | ○ | X |
| 55 | 0.55 | ○ | X | X | X |

Referring to Table 1, when the angle of inclination "a" of the first bent portion 131 to the first connection portion 132 is less than 70°, the tantalum body 110 may be brought close to a side of the sixth surface 6 of the molded portion 120 during welding of the tantalum wire 111 and the first bent part 131, so that the tantalum body 110 may be exposed outwardly of the molded portion 120.

When an angle of the first bent portion 131 is greater than 80°, the tantalum wire 111 may be brought close to a side of the fifth surface 5 of the molded portion 120 during welding of the tantalum wire 111 and the first bent portion 131, so that the tantalum wire 111 may be exposed outwardly of the molded portion 120.

From Table 1, it can be seen that the angle of inclination "a" of the first bent portion 131 to the first connection portion 132 of the tantalum capacitor 100 may be adjusted to a predetermined range to provide a tantalum capacitor having capacitance significantly increased even in the same standard. Accordingly, characteristics of a tantalum capacitor, in which a withstand voltage is improved with an increase in volume of a sintered body even in the same size, may be significantly increased. In addition, a breakdown voltage (BDV) may be increased to improve reliability of a product.

Also, referring to Table 1, when the angle of inclination "a" the angle of inclination "a" of the first bent portion 131 to the first connection portion 132 is less than 60°, the tantalum body 110 may be brought close to the second surface 2 of the molded portion 120, so that the tantalum body 110 may be exposed to the outside of the molded portion 120.

Also, referring to Table 1, when the angle of inclination "a" between the first bent portion 131 and the first connection portion 132 is decreased to 55° or less or increased to 95° or more, the tantalum body 110 may be brought close to the first connection portion 132, so that the tantalum body 110 and the first connection portion 132 of the anode lead frame 130 may be short-circuited.

From Table 1, it can be seen that the angle of inclination "a" of the first bent portion 131 to the first connection portion 132 may be adjusted to a predetermined range, so that a bending height of the first bent portion 131 may be adjusted to be constant. The first bent portion 131 having the bending height may effectively mitigate mechanical shock generated during welding due to a bent structure.

As described above, when the tantalum wire 111 is bonded to the first bent portion 131, the first bent portion 131 may have a high angle of inclination to the second surface 2 of the molded portion 120 or the first connection portion 132. Therefore, mechanical stress of the first connecting portion 132 may be improved in a third direction in which the first bent portion 131 receives a pressure from the tantalum wire 111 during welding. Accordingly, a configuration of the support portion supporting the first connection portion 132, required in the tantalum capacitor according to the related art, may not be required, so that a volume of the tantalum body 110 may be increased to the extent to achieve high capacitance of the tantalum body 110.

As described above, the first bent portion 131 may have a high angle of inclination "a" to the second surface 2 of the molded portion 120 or the first connection portion 132. Therefore, assuming that the tantalum wire 111 has the same length, a length of the tantalum body 110 in the first direction X may be increased as compared with a conventional structure, which may also contribute to high capacitance of the tantalum body 110.

In this case, the welding may be performed using, in detail, an electric spot-welding method, but exemplary embodiments are limited thereto.

In the tantalum capacitor 100 according to an exemplary embodiment, the molded portion 120 may be formed to expose one surface of the first connection portion 132 of the anode lead frame 130 and one surface of the second connection portion 142 of the cathode lead frame 140.

The molded portion 120 of the tantalum capacitor according to the present disclosure may be formed by transfer-molding a resin such as an epoxy molding compound (EMC) to surround the tantalum body 110. The molded portion 120 may serve to protect the tantalum wire 111 and the tantalum body 110 from the outside.

The first connection portion 132 may include first and second regions 132a and 132b having different thicknesses. Referring to the side view of FIG. 3, a thickness of the first region 132a of the first connection portion 132 may be smaller than a thickness of the second region 132b of the first connection portion 132. Accordingly, a step may be formed between upper surfaces of the first and second regions 132a and 132b. For example, as illustrated in FIG. 3, a recess or a reduced-thickness portion R may be formed on the first region 132a of the first connection portion 132. On the other hand, the first region 132a of the first connector 132 may be closer to the tantalum body 110 than the second region 132b of the first connector 132. For example, the first region 132a of the first connection portion 132 may be disclosed inside the second region 132b in the first direction X. When viewed in the third direction Z, at least a portion of the tantalum body 110 may overlap at least a portion of the first region 132a of the first connection portion 132.

As the thickness of the first region 132a close to the tantalum body 110 of the first connection portion 132 is lower than the thickness of the second region 132b, a distance between the tantalum body 110 and the first connection portion 132 spaced apart from each other may be increased to reduce a possibility that short-circuits occurs. In addition, the volume of the tantalum body 110 may be increased to that extent, which is advantageous in increasing the capacitance of the tantalum body 110 and the tantalum capacitor 100.

The first lead portion 133, as a configuration of the anode lead frame 130, may be disposed to protrude outwardly of the molded portion 120. The first lead portion 133 may refer to a region, divided from the above-described first connection portion 132 by a bent portion of the first bent portion 131 as a boundary, in the anode lead frame 130. Referring to FIGS. 1 and 2, the anode lead frame 130 may include a first bent portion 131, a first connection portion 132, and a first lead portion 133, and the first lead portion 133 may protrude outwardly of the molded portion 120. As described in the present example, in the case in which the first lead portion 133 is disposed to protrude outwardly of the molded portion 120, a bonding area of a solder may be increased when a substrate of the tantalum capacitor 100 is mounted, and thus, substrate fixing force may be improved.

The cathode lead frame 140 may be formed of a conductive metal such as a nickel/iron alloy, and may include a second bending portion 141, a second connection portion 142, and a second lead portion 143 formed to be integrated with each other.

The second connection portion 142 may be disposed to be spaced apart from each other in parallel to the first connection portion 132 of the anode lead frame 130 in the first direction X. The second connection portion 142 of the cathode lead frame 140 may be exposed to the second surface 2 of the molded portion 120. The second connection portion 142 may be exposed to a lower surface of the molded portion 120 to serve as a terminal when the board is mounted. In this case, the second connection portion 142 may be in contact with the tantalum body 110 and may function as a cathode of the tantalum capacitor 100 according to the present disclosure.

In an exemplary embodiment, the second bending portion 141 may be vertically bent toward a side of the tantalum body 110. Referring to FIG. 2, the cathode lead frame 140 may include a second bending portion 141, a second connection portion 142, and a second lead portion 143, and the second bending portion 141 may bend toward the tantalum body 110. Accordingly, mechanical strength of the tantalum capacitor according to the present disclosure may be significantly increased.

Referring to FIG. 2, the second bending portion 141 may be formed in a central portion of the cathode lead frame 140, but exemplary embodiments are not limited thereto. The second bending portion 141 may be formed on an external side of the cathode lead frame 140 or formed on one side of the cathode lead frame 140. In addition, the second bonding portion 141 may be transformed into various forms connected to the tantalum body 110, as a structure bent at the cathode lead frame 140.

In an exemplary embodiment, the second lead portion 143 may refer to a portion of the cathode lead frame 140 excluding the second connection portion 142 and the second bending portion 141. In this case, the cathode lead frame 140 may include a cut surface. A portion, which is bent with respect to the cut surface, may refer to the second bending portion 141 and a portion, which is not bent with respect to the cut surface, may refer to the second lead portion 143. The cut surface may be formed in the first direction X, the second direction Y, and/or the third direction Z of the cathode lead frame 140. In the present specification, drawings are drawn based on a structure in which the cathode lead frame 140 has a cut surface and the second lead portion is present. In the present disclosure, the anode lead frame 130 or the cathode lead frame 140 may not have the cut surface. When the cathode lead frame 140 does not have the cut surface, it may refer to a structure in which only the second bending portion 141 and the second connection portion 142 are present and the second lead portion is absent. Such a structure may be a structure in which the connection portion is exposed to only the second surface 2 of the molded portion, and may be prevent short-circuits with other components and may be advantageous in increasing board mounting density.

Referring to FIG. 2, the second lead portion 143 of the cathode lead frame 140 may be disposed to protrude outwardly of the molded portion 120. The second lead portion 143 may refer to a region, divided from the above-described second connection portion 142 by the bending portion of the second bending portion 141 as a boundary, in the cathode lead frame 140. Referring to FIG. 2, the cathode lead frame 140 may include a second bending portion 141, a second connection portion 142, and a second lead portion 143, and the second lead portion 143 may protrude outwardly of the molded portion 120. As described in the present example, in the case in which the second lead portion 143 is disposed to protrude outwardly of the molded portion 120, a bonding area of a solder may be increased when mounting a substrate of the tantalum capacitor according to the present disclosure, and thus, substrate fixing force may be improved.

When the cathode lead frame does not have an additional cut surface, the cathode lead frame may include a second bending portion and a second connection portion and may not include a second lead portion. In this case, the cathode lead frame may be exposed outwardly of the molded portion through only the second connection portion.

In the tantalum capacitor 100 according to an exemplary embodiment, an anode terminal may be formed on the first connection portion 132 and a cathode terminal may be formed on the second connection portion 142. The anode terminal and/or the cathode terminal may include a conductive material, for example, one of a chromium-titanium intermetallic compound (Cr(Ti)), copper (Cu), nickel (Ni), palladium (Pd), gold (Au), or combinations thereof and may be formed by a sputter deposition method or a plating method.

Figure 4:
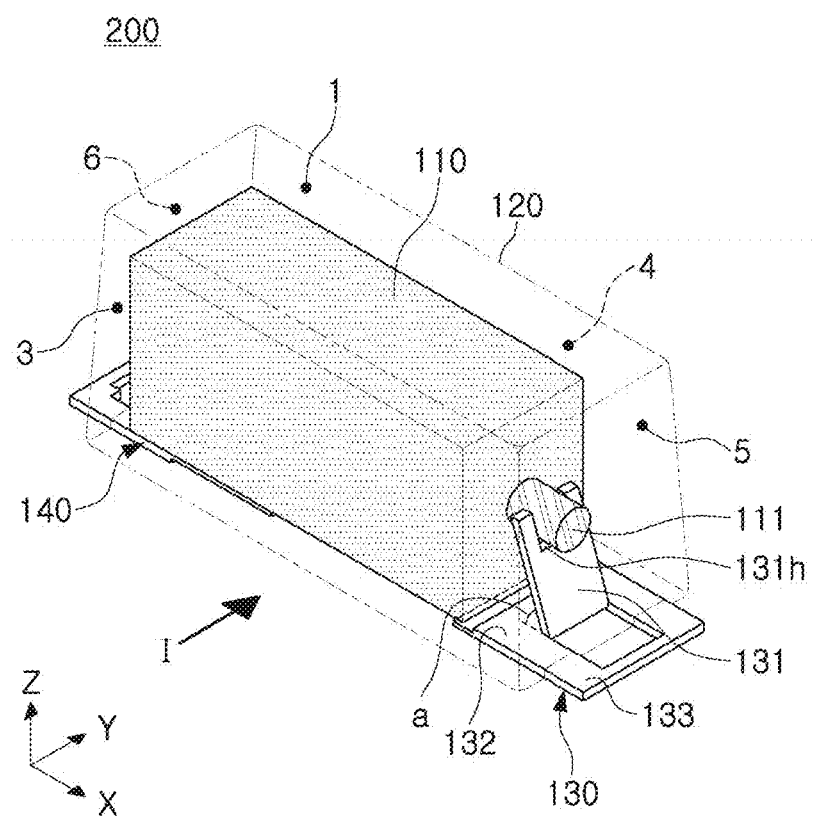
FIG. 4 is a perspective view of a tantalum capacitor according to another embodiment of the present disclosure.

FIG. 4 is a perspective view of a tantalum capacitor according to another embodiment.

Referring to FIG. 4, a tantalum capacitor 200 according to another embodiment may include a first connection portion 131 in which a groove 131h is formed, as compared with the tantalum capacitor 100 according to the embodiment. Therefore, a description will be provided for only the first connection portion 131 and the groove 131h. Descriptions of the other configurations of the present embodiment may be substituted with those of an embodiment as it is.

In the case of the tantalum capacitor 200 according to another embodiment, an anode lead frame 130 may have a groove 131h, formed in an end portion of a first bent portion 131, through which a tantalum wire 111 is fitted. Referring to FIG. 4, the groove 131h may be disposed in an end portion of the first bent portion 131 of the anode lead frame 130, and the tantalum wire 111 may be fitted into the groove 131h in the end portion of the first bent portion 131. In this case, a surface on which the tantalum wire 111 and an end portion of the first bent portion 131 are in contact is described as having a U-shape, but exemplary embodiments are not limited thereto. As necessary, the surface may have a V-shape or a rectangular shape.

In the tantalum capacitor 200 according to another embodiment, a groove into which the tantalum wire 111 is fitted may be disposed in an end portion of the first bent portion 131 to increase a contact area between the first bent portion 131 and the tantalum wire 111, so that an operation may be safely performed to prevent deterioration of electrical connectivity. A method of forming such a groove is not limited, and such a groove may be formed, for example, by punching or cutting a portion of the first bent portion 131.

The other contents are substantially the same as those described in the tantalum capacitor 100 according to an embodiment, and a detailed description thereof will be omitted.

Figure 5:
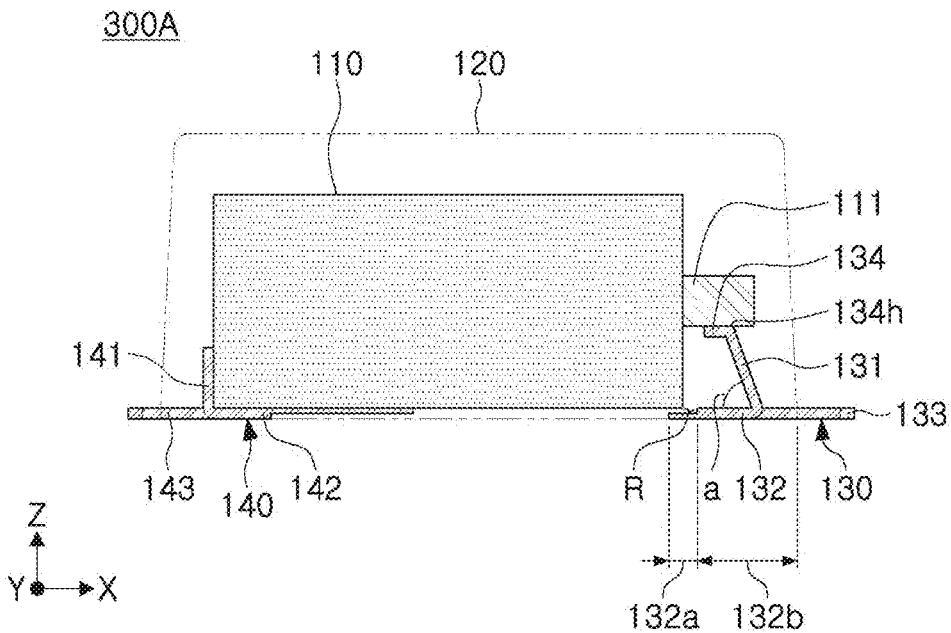
FIGS. 5 and 6 are side views of tantalum capacitors according to another embodiment and a modified embodiment of the present disclosure, respectively.
Figure 6:
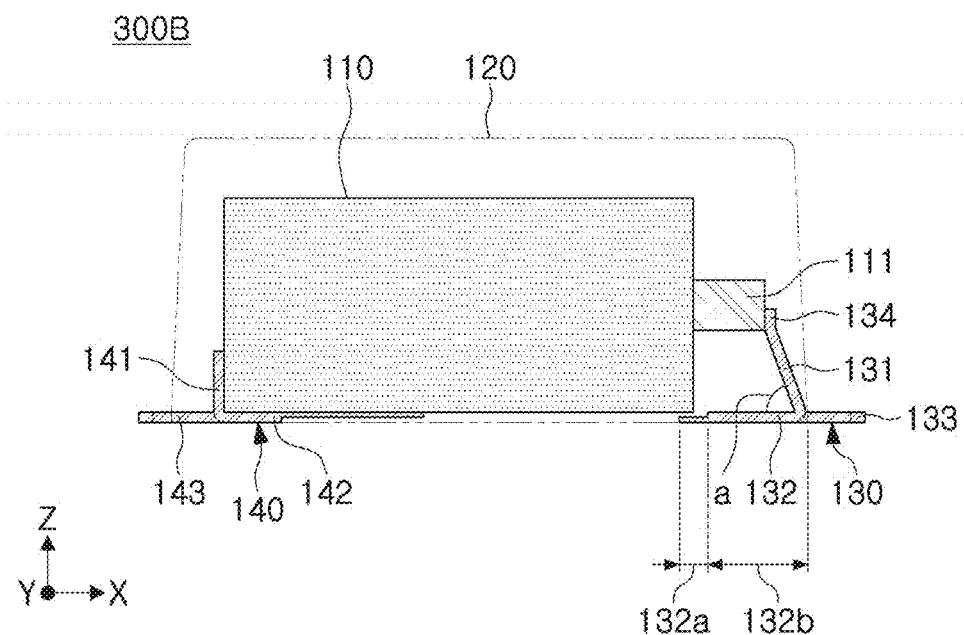

FIGS. 5 and 6 are side views of tantalum capacitors according to another embodiment and a modified embodiment of the present disclosure, respectively.

Referring to FIGS. 5 and 6, tantalum capacitors 300A and 300B according to another embodiment and a modified embodiment may include an anode lead frame 130 further including a bending portion 134 disposed on an end of a first bent portion 131, as compared with the tantalum capacitor according to an embodiment. Therefore, a description will be provided for only the bending portion 134 and a groove 134h formed in the bending portion 134. Descriptions of the other configurations of the present embodiment may be substituted with those of an embodiment as it is.

In the tantalum capacitor 300A according to another embodiment, the anode lead frame 130 may include a bending portion 134 on an end of the first bent portion 131, and the bending portion 134 may be connected to a tantalum wire 111. FIG. 5 is a diagram illustrating a tantalum capacitor 300A according to another embodiment in which a bending portion 134 is disposed on an end of the first bent portion 131 and the bending portion 134 is in contact with and connected to a lower surface of the tantalum wire 111. In this case, the bending portion 134 may be bent toward a lower end of the tantalum wire 111, and the upper surface 134a of the bending portion 134 may be connected to the lower surface of the tantalum wire 111.

In the case of the tantalum capacitor 300A according to another embodiment, a groove 134h may be disposed in the bending portion 134. The tantalum wire 111 may be in contact with the bending portion 134 through the groove 134h of the bending portion 134. In this case, the bending portion 134 may be bent toward the tantalum wire 111, and at least a portion of the tantalum wire 111 may be disposed in the groove 134h of the bending portion 134 to be in contact with and connected to the bending portion 134.

FIG. 6 is a diagram illustrating an example of a modified example 300B of the tantalum capacitor of FIG. 5. Referring to FIG. 6, a bending portion 134 may be disposed on an end of the first bent portion 131, and the tantalum wire 111 may be in contact with the bending portion 134. In this case, the bending portion 134 may be bent to a side surface of the tantalum wire 111, and a side surface of the bending portion 134 may be connected to one end portion or the side surface of the tantalum wire 111.

As described in the foregoing embodiment, a length of the tantalum wire 111 may be decreased by disposing the bending portion 134 on the end of the first bent portion 131 and connecting a tantalum wire to the bending portion 134. Accordingly, a length of the tantalum body 110 may be increased by the decreased length of the tantalum wire 111 to further secure a volume and capacity of the tantalum body 110.

In addition, in the above exemplary embodiment, when the tantalum wire 111 is bonded to the first bent portion 131 through the bending portion 134, the first bent portion 131 has a high angle of inclination to the second surface 2 of the molded portion 120 or the first connection portion 132. Therefore, mechanical stress of the first connection portion 132 may be improved in a third direction in which the first bent portion 131 receives a pressure from the tantalum wire 111. Accordingly, a configuration of the support portion supporting the first connection portion 132, required in the tantalum capacitor according to the related art, may not be required, so that a volume of the tantalum body 110 may be increased to the extent to achieve high capacitance of the tantalum body 110. As described above, the first bent portion 131 may have a high angle of inclination "a" to the second surface 2 of the molded portion 120 or the first connection portion 132. Therefore, assuming that the tantalum wire 111 has the same length, a length of the tantalum body 110 in the first direction X may be increased as compared with a conventional structure, which may also contribute to high capacitance of the tantalum body 110.

In this case, the welding may be performed using, in detail, an electric spot-welding method, but exemplary embodiments are not limited thereto.

The other contents are substantially the same as those described in the tantalum capacitor 100 according to an embodiment, and a detailed description thereof will be omitted.

Figure 7:
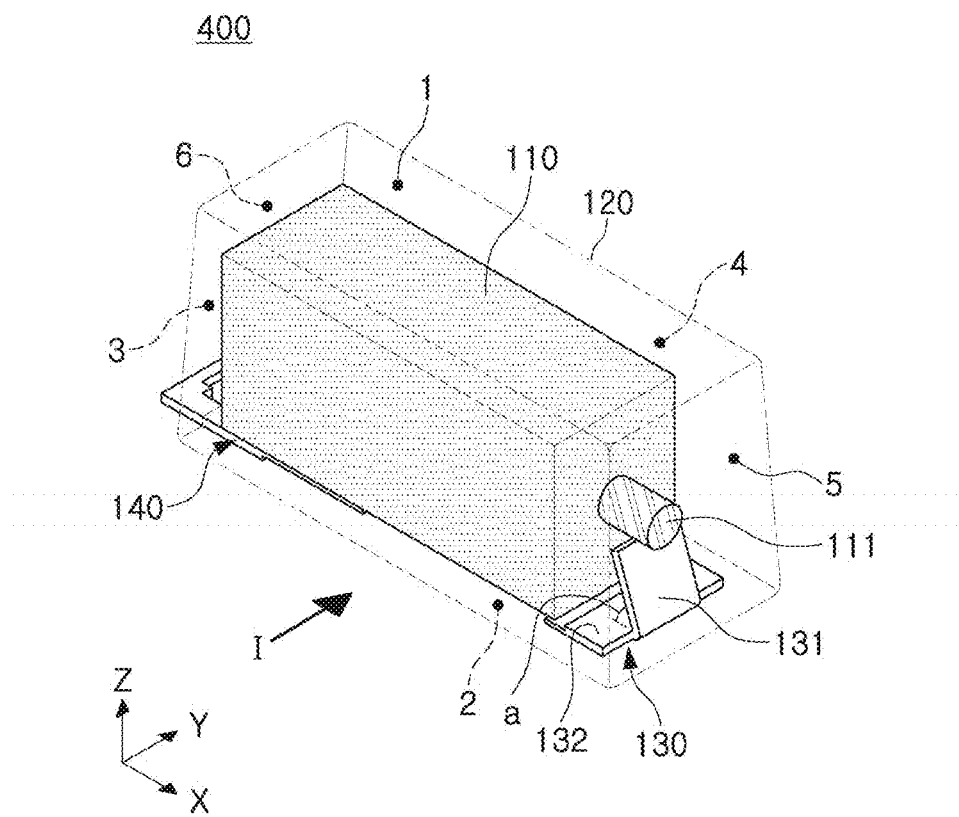
FIG. 7 is a perspective view of a tantalum capacitor according to another embodiment of the present disclosure.

FIG. 7 is a perspective view of a tantalum capacitor according to another embodiment.

Referring to FIG. 7, a tantalum capacitor 400 according to another embodiment may include an anode lead frame 130 which does not include a lead portion and includes only a first bent portion 131 and a first connection portion 132, as compared with the tantalum capacitor 100 according to the embodiment. Therefore, a description will be provided for only a structure of the anode lead frame 131. Descriptions of the other configurations of the present embodiment may be substituted with those of an embodiment as it is.

As illustrated in 7, when the anode lead frame 130 does not have an additional cut surface, the anode lead frame 130 may include a first bent portion 131 and a first connection portion 132 and may not include a lead portion. In this case, the anode lead frame 130 may be exposed outwardly of the molded portion 120 through only the first connection portion 132. Such a structure is a structure in which the connection portion is exposed to only the second surface 2 of the molded portion 130, and is advantageous in preventing short-circuits with other components and increasing board mounting density.

The other contents are substantially the same as those described in the tantalum capacitor 100 according to an embodiment, and a detailed description thereof will be omitted.

Figure 8:
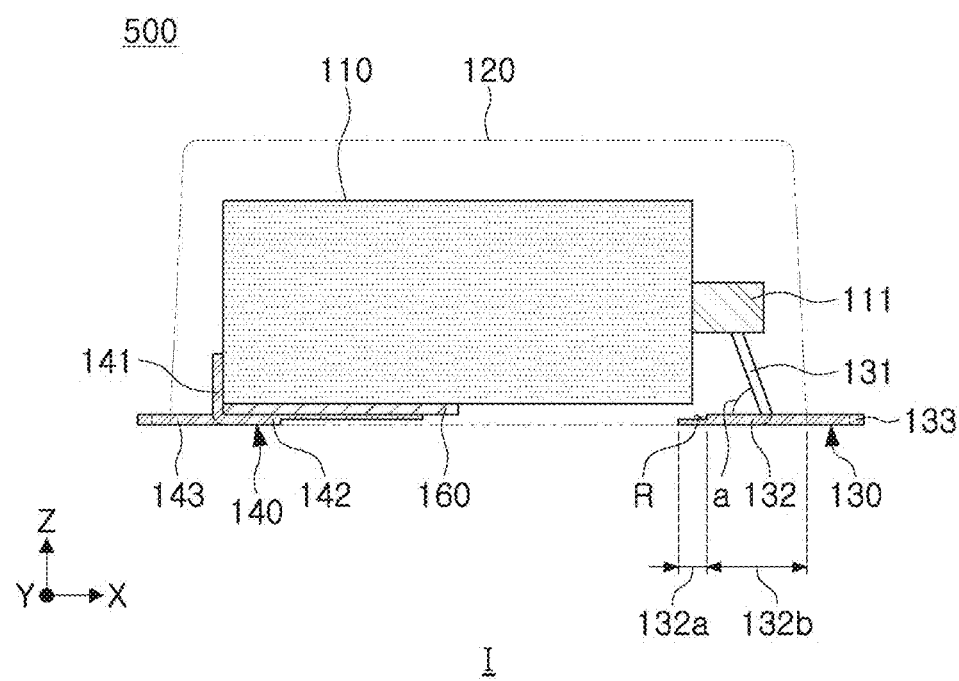
FIG. 8 is a side view of a tantalum capacitor according to another embodiment of the present disclosure.

FIG. 8 is a side view of a tantalum capacitor according to another embodiment.

Referring to FIG. 7, a tantalum capacitor 500 according to another embodiment may further include a conductive adhesive layer 150 disposed between a tantalum body 110 and a cathode lead frame 140. Therefore, a description will be provided for only a structure of the conductive adhesive layer 150. Descriptions of the other configurations of the present embodiment may be substituted with those of an embodiment as it is.

In an exemplary embodiment, a conductive adhesive layer 150 may be disposed between a second connection portion 142 of the cathode lead frame 140 and the tantalum body 110. In addition, a conductive adhesive layer may be disposed between a second bending portion 141 of the cathode lead frame 140 and the tantalum body 110.

The conductive adhesive layer 150 may be formed by applying a predetermined amount of conductive adhesive including, for example, an epoxy-based thermosetting resin and a conductive metal powder such as silver (Ag) and curing the applied conductive adhesive, but exemplary embodiments are not limited thereto. When the conductive adhesive layer 150 is applied to the tantalum capacitor 110 according to the present disclosure, adhesion strength of the anode lead frame 140 may be improved.

As described above, a tantalum capacitor, which may implement high capacitance, may be provided.

In addition, a tantalum capacitor, having improved reliability by increasing mechanical strength, may be provided.

In addition, a tantalum capacitor, which may improve a breakdown voltage (BDV) by increasing a withstand voltage, may be provided.

In addition, a tantalum capacitor, which may prevent short-circuits caused by a contact between a terminal and a tantalum body, may be provided.

In addition, a tantalum capacitor, which may reduce equivalent series resistance (ESR), may be provided.

While exemplary embodiments have been shown and described above, it will be apparent to those skilled in the art that modifications and variations could be made without departing from the scope of the present disclosure as defined by the appended claims.

What is claimed is:

1. A tantalum capacitor comprising:
a tantalum body including tantalum powder and having a tantalum wire exposed to one end surface of the tantalum body;
a molded portion having two surfaces opposing each other in a first direction, two surfaces opposing each other in a second direction, and two surfaces opposing each other in a third direction, the two surfaces opposing in the third direction being first and second surfaces, the two surfaces opposing in the second direction being third and fourth surfaces, the two surfaces opposing in the first direction being fifth and sixth surfaces;
an anode lead frame exposed to the second surface of the molded portion and electrically connected to the tantalum wire; and
a cathode lead frame spaced apart from the anode lead frame and exposed to the second surface of the molded portion,
wherein the anode lead frame includes a first connection portion, a first lead portion, a cut surface and a first bent portion, and the first bent portion forms an angle of inclination, ranging from 70° or more to 80° or less, with respect to the first connection portion, the first bent portion being inclined toward a side of the tantalum body,
wherein the first bent portion comprises a portion of the anode lead frame removed from the first lead portion so as to form the cut surface and an end portion contacting the tantalum wire,
wherein the anode lead frame includes a bending portion disposed on an end of the first bent portion, and the bending portion and the tantalum wire are in contact with and connected to each other, and
wherein the bending portion extends from the end of the first bent portion in a direction substantially parallel to an elongation direction of the tantalum wire.

2. The tantalum capacitor of claim 1, wherein the first connection portion includes a first region and a second region having different thicknesses.

3. The tantalum capacitor of claim 2, wherein the thickness of the first region is smaller than the thickness of the second region.

4. The tantalum capacitor of claim 3, wherein the first region of the first connection portion is disposed inside the second region in the first direction.

5. The tantalum capacitor of claim 4, wherein the tantalum body and at least a portion of the first region overlap each other when viewed in the third direction.

6. The tantalum capacitor of claim 5, wherein the first connection portion is disposed to be spaced apart from the tantalum body.

7. The tantalum capacitor of claim 1, wherein a notch-type groove is formed in one end portion of the first bent portion, and
at least a portion of the tantalum wire is disposed in the groove of the first bent portion.

8. The tantalum capacitor of claim 1, wherein the first lead portion protrudes outwardly of the molded portion.

9. The tantalum capacitor of claim 1, wherein the cathode lead frame includes a second connection portion, a second bent portion vertically bent to a side of the tantalum body, and a second lead portion.

10. The tantalum capacitor of claim 9, wherein the cathode lead frame includes a cut surface in a direction of the tantalum body, and
the second lead portion and the second bent portion are divided with respect to the cut surface.

11. The tantalum capacitor of claim 9, wherein the second lead portion protrudes outwardly of the molded portion.

12. The tantalum capacitor of claim 9, further comprising:
a conductive adhesive layer disposed between the cathode lead frame and the tantalum body.

13. A tantalum capacitor comprising:
a tantalum body including tantalum powder and having a tantalum wire exposed to one end surface of the tantalum body;
a molded portion surrounding the tantalum body;
an anode lead frame embedded in the molded portion and exposed to one surface of the molded portion; and
a cathode lead frame spaced apart from the anode lead frame and exposed to the one surface of the molded portion,
wherein the anode lead frame includes a first connection portion exposed to the one surface of the molded portion and a first bent portion extending from the first connection portion to be connected to the tantalum wire in a slanted angle with respect to the first connection portion,
wherein an end of the first bent portion contacts the tantalum wire without extending past a cross-section of the tantalum wire,
wherein the cathode lead frame includes a second connection portion, a second bent portion vertically bent to a side of the tantalum body, and a second lead portion,
wherein the second bent portion is in contact with the tantalum body and a portion of the first connection portion overlaps at least one portion of the tantalum body in a direction perpendicular to the one surface of the tantalum body.

14. The tantalum capacitor of claim 13, wherein the first bent portion forms an angle of inclination, ranging from 70° or more to 80° or less, with respect to the first connection portion, the first bent portion being inclined toward a side of the tantalum body.

15. The tantalum capacitor of claim 13, wherein a space between the tantalum wire and an outer surface, adjacent to the tantalum wire, of the molded portion is free of the first connection portion.

16. The tantalum capacitor of claim 13, wherein the first connection portion includes a reduced-thickness portion that overlaps the at least one portion of the tantalum body in the direction perpendicular to the one surface of the tantalum body.

17. The tantalum capacitor of claim 13, wherein the anode lead frame includes a first lead portion, extending from the first bent portion, and a cut surface, and
the first bent portion of the first lead portion is divided with respect to the cut surface.

18. The tantalum capacitor of claim 13, wherein a notch-type groove is formed in one end portion of the first bent portion, and
at least a portion of the tantalum wire is disposed in the groove of the first bent portion.

* * * * *